March 26, 1940.　　　　J. S. FOSTER　　　　2,195,168

METHOD AND APPARATUS FOR MEASURING SPECTROGRAMS

Original Filed Oct. 6, 1936

JOHN STUART FOSTER
INVENTOR.

BY
ATTORNEYS

Patented Mar. 26, 1940

2,195,168

UNITED STATES PATENT OFFICE 2,195,168

METHOD AND APPARATUS FOR MEASURING SPECTROGRAMS

John Stuart Foster, Westmount, Quebec, Canada, assignor to Bausch & Lomb Optical Company, Rochester, N. Y., a corporation of New York Application October 6, 1936, Serial No. 104,253
Renewed November 25, 1939

7 Claims. (Cl. 88—14)

The present invention relates to measuring devices and methods and more particularly to methods and devices for measuring the difference in lengths of lines or portions of a wedge spectrogram.

For some determinations, it is necessary to measure the difference in the lengths of different lines or portions of a wedge spectrogram. Heretofore, this has been done by measuring the length of each line or portion and finding the difference. In both the continuous and discontinuous wedge spectrograms, the intensity decreases from the bottom of the spectrogram to an extinction point at the top and the lines of the discontinuous wedge spectrogram taper as well. The measuring system of the prior art was therefore inherently uncertain and inaccurate because of the difficulty of determining the exact extinction point of the line or portion of the spectrogram under consideration. I have found that when two such lines or portions can be moved relatively to each other, their extinction points can be brought into juxtaposition with great accuracy. A measure of the amount of relative movement is therefore an accurate measure of the difference in the lengths of the two lines.

One of the objects of the present invention is to provide a new and improved method and apparatus for measuring the difference in the lengths of the lines or portions of a wedge spectrogram. Another object is to provide a method and apparatus for measuring the difference in the lengths of the lines of a discontinuous wedge spectrogram in which adjacent images of the lines are formed in a view field and one of the images is displaced to bring the tapered ends of the lines into juxtaposition. A further object is to provide a method and apparatus for measuring the difference in the lengths of different selected portions of a continuous wedge spectrogram in which artificial lines are formed from the selected portions and the lengths of these artificial lines measured. These and other objects and advantages reside in certain novel features of construction, arrangement and combination of parts and processes as will hereinafter be more fully set forth and pointed out in the appended claims.

Referring to the drawing.

Figure 1:
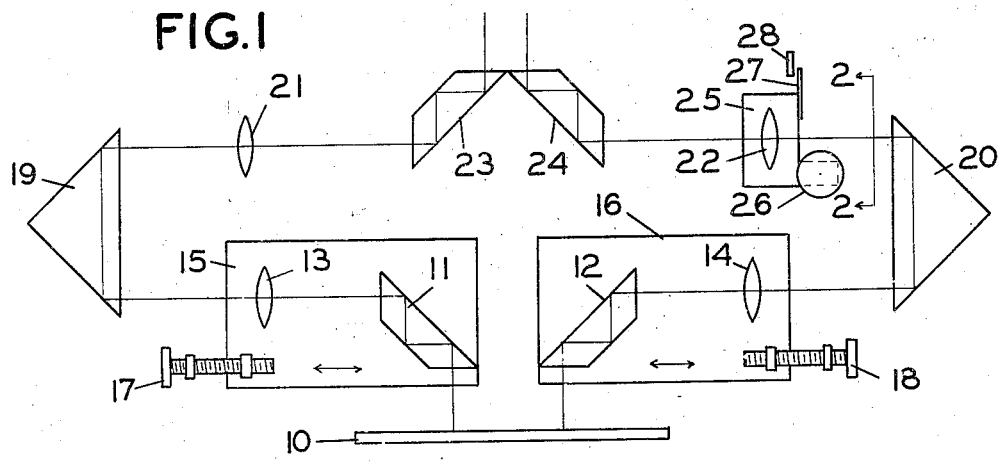
Fig. 1 is a front elevation of a device embodying the present invention.
Figure 2:
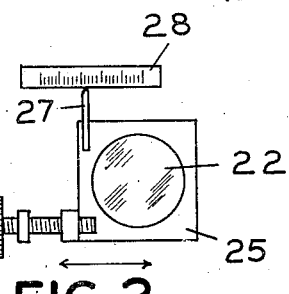
Fig. 2 is a view of the image displacing system, taken on line 2—2 of Fig. 1.

One form of apparatus for measuring the lines of a discontinuous wedge spectrogram according to the present invention is illustrated in the drawing wherein 10 designates a discontinuous wedge spectrogram support above which are mounted two oppositely facing, right angle prisms 11 and 12 which direct the light from the discontinuous spectrogram 10 to two lenses 13 and 14, respectively. The prism 11 and lens 13 are rigidly mounted in fixed relation on a slide 15 which can be moved in a direction parallel to the plane of the spectrogram 10 by means of a screw 17. The prism 12 and lens 14 are similarly mounted on a slide 16 similarly controlled by a screw 18. The lenses 13 and 14 are such that their principal foci lie in the plane of the spectrogram 10 and therefore the movement of the slides 15 and 16 will have no effect on the focusing of the lenses 13 and 14.

From the lenses 13 and 14, the light passes to two right angle prisms 19 and 20, respectively, where the light is twice reflected and directed back in a direction parallel to the direction of incidence. After leaving the prisms 19 and 20, the light passes through two lenses 21 and 22, respectively, to two contiguous right angle prisms 23 and 24, respectively. The lenses 21 and 22 have their principal foci in the exit faces of the prisms 23 and 24 which prisms form a split image field. Since the lens systems 13, 21 and 14, 22 have their principal foci always in the object and image planes, the movement of the lenses 13 and 14 does not change either the location or size of the images.

In order to displace one image in the direction of the length of the spectrogram line, the lens 22 is mounted in a slide 25 which is movable across the optical axis under the control of a screw 26. A pointer or vernier 27 on the slide 25 cooperates with a scale 28 to determine the extent of movement of the slide 25.

Figure 3:
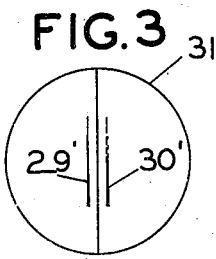
Fig. 3 is a view of the image field as it appears to the observer.
Figure 4:
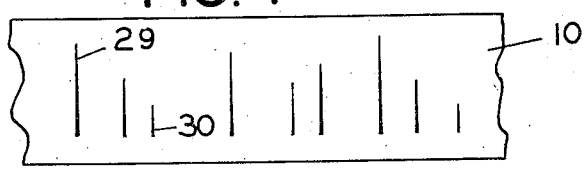
Fig. 4 is a view of a typical discontinuous wedge spectrogram.

As shown in Fig. 4, the lines of the usual discontinuous wedge spectrogram taper off to a vanishing point in a manner well known to those skilled in the art. When it is desired to obtain the difference in length between the lines 29 and 30, for some purpose such as quantitative analysis, the prisms 11 and 12 are positioned over these lines and the images 29' and 30' are formed in the image field 31. The lens 22 is then moved by means of the screw 26 until the images 29' and 30' are in juxtaposition as indicated by the dotted outline in Fig. 3. The amount of displacement of the image can then be read from the scale 28.

Figure 6:
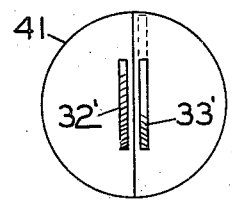
Fig. 6 is a view of the image field of the modification shown in Fig. 5.
Figure 7:
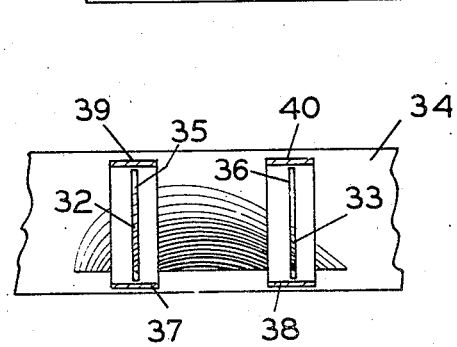
Fig. 7 is a view of a typical continuous wedge spectrogram showing the masking diaphragms in place.
Figure 5:
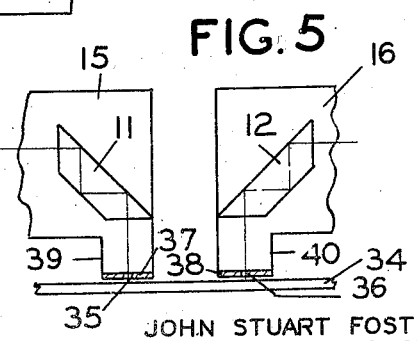
Fig. 5 is a fragmentary view of a modification for measuring continuous wedge spectrograms.

Figs. 5, 6 and 7 illustrate the modifications of the above-described apparatus necessary for measuring the lengths of different selected portions of a continuous wedge spectrogram. In this modified form of the apparatus, two artificial lines 32 and 33 are formed from the continuous wedge spectrogram 34 by means of the slots 35 and 36 in the two diaphragm plates 37 and 38, respectively. The diaphragm plate 37 is secured to the slide 15 by a bracket 39 so that its slot 35 is in alignment with the prism 11 and the diaphragm plate 38 is similarly secured to the plate 16 by the bracket 40. The brackets 39 and 40 may, of course, be removably secured on the plates 15 and 16 so that the apparatus may be readily converted from one form to the other. The optical systems of both forms are identical in construction and operation.

The artificial lines 32 and 33 formed from two selected portions of the continuous spectrogram are imaged at 32' and 33' in the image field 41. These images 32' and 33' are dark at the bottom and their intensity decreases to extinction points at the top and, as in the case of the lines of the discontinuous spectrogram, one image is displaced until the extinction points of the two images are in juxtaposition. The amount of displacement is then the difference in the lengths of the two artificial lines.

From the foregoing it will be apparent that I am able to attain the objects of my invention and provide a new and improved method and apparatus for measuring the difference in the lengths of portions of a wedge spectrogram. In the claims the term "line" can designate either the line of the discontinuous spectrogram or the artificial line formed from the continuous spectrogram by means of a diaphragm plate. The structure of the optical system is set forth merely as an example and various modifications can readily be made without departing from the spirit of my invention or the scope of the appended claims.

I claim:

1. The method of measuring the difference in length between two lines of a wedge spectrogram, each having an extinction point at one end and a base at the other, which method comprises forming parallel adjacent images of the two lines, displacing one of said images in the direction of its length until the images of the extinction points of the two lines are in immediately adjacent relation, and determining the distance between the images of the bases of said lines.

2. The method of measuring the difference in length between two selected portions of a continuous wedge spectrogram comprising forming from each of said portions an artificial line having a base at one end and an extinction point at the other, forming adjacent parallel images of the two lines, displacing one of said images in the direction of its length until the images of the extinction points of the two lines are in immediately adjacent relation, and determining the distance between the images of the bases of said lines.

3. An apparatus for measuring the difference in length between two selected lines of a wedge spectrogram, each line having an extinction point at one end and a base at the other, comprising a support for a spectrogram, selection means movable longitudinally of the spectrogram support and in alignment with said support for selecting the lines whose difference in length is to be determined, means in alignment with said selection means for forming parallel adjacent images of the two selected lines, means for displacing one of the images relative to the other in the direction of its length until the images of the extinction points of the two lines are in immediately adjacent relation, and means for determining the distance between the images of the bases of the two lines.

4. An apparatus for measuring the difference in the lengths of two selected portions of a continuous wedge spectrogram comprising a spectrogram support, means in alignment with said support for forming from each of said portions an artificial line having a base at one end and an extinction point at the other, means for forming adjacent parallel images of the two artificial lines in a common observation field, means for displacing the image of one of said lines in the direction of its length relative to the image of the other line until the images of the extinction points of the two lines are in immediately adjacent relation, and means for measuring the distance between the images of the bases of the two lines.

5. An apparatus for measuring the difference in length between two lines of a wedge spectrogram comprising a spectrogram support, two optical trains, each train comprising a reflector for receiving light from a spectrogram on the support and reflecting it in a direction parallel to the plane of the support and at right angles to a line of a spectrogram on the support, a lens adjacent the reflector and having its principal focus at the plane of a spectrogram on the support, means for moving the lens and reflector along the axis of the reflected ray, and a second lens for receiving light from the first-named lens to form an image of a line of a spectrogram on said support, means for combining the rays from both optical trains at an observation field, means for displacing the image formed by one optical train relative to the image formed by the other optical train in the direction of the length of the image, and means for measuring the amount of such displacement.

6. A device for measuring the difference in the lengths of two selected portions of a continuous wedge spectrogram comprising a spectrogram support, two parallel narrow linear diaphragms movably mounted above said support so that they extend across a spectrogram positioned on said support, means for moving said diaphragms to the selected portions of said spectrogram, two optical systems in alignment one with each diaphragm for forming adjacent parallel images of the portions outlined by said diaphragms, means for displacing one of said images relative to the other in the direction of its length until its top is in immediately adjacent relation with the top of the other image, and means for measuring the amount of such displacement.

7. A device for determining the difference in the lengths of two lines of a wedge spectrogram each having an extinction point at one end and a base at the other comprising a spectrogram support, an optical system for forming an image of one line of a spectrogram on said support, a movable optical system for forming an image of a second line of a spectrogram on said support parallel to the image of the first line, means for moving said movable system transversely of the lines of a spectrogram on said support for selecting the line to be compared with the line imaged by the first optical system, an observation field, means for directing the images from both optical systems to adjacent parallel portions of said observation field and means for displacing the line image formed by one optical system relative to the other line image in the direction of the length of the line image.

JOHN STUART FOSTER.